United States Patent
Waters et al.

(10) Patent No.: US 6,331,351 B1
(45) Date of Patent: Dec. 18, 2001

(54) CHEMICALLY ACTIVE FILTER MATERIAL

(75) Inventors: Michelle Waters, Altoona, WI (US); Marc Plinke, Elkton, MD (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 09/401,594

(22) Filed: Sep. 22, 1999

(51) Int. Cl.$^7$ .................. B32B 7/12; B01J 23/00
(52) U.S. Cl. ...................... 428/317.7; 428/317.9; 502/350; 502/353; 502/344; 502/325; 502/339; 422/177; 96/135; 96/147
(58) Field of Search .................. 502/350, 353, 502/344, 325, 339; 428/317.9, 317.7; 422/177; 96/135, 147

(56) References Cited

U.S. PATENT DOCUMENTS

| | | | |
|---|---|---|---|
| 3,953,566 | 4/1976 | Gore | 264/288 |
| 4,220,633 | 9/1980 | Pirsh | 423/239 |
| 4,309,386 | 1/1982 | Pirsh | 422/177 |
| 4,732,879 | 3/1988 | Kalinowski et al. | 502/5 |
| 4,983,434 * | 1/1991 | Sassa . | |
| 5,051,391 | 9/1991 | Tomisawa et al. | 502/242 |
| 5,468,536 * | 11/1995 | Whitcomb et al. . | |
| 5,476,589 | 12/1995 | Bacino | 210/500.36 |
| 5,605,746 | 2/1997 | Groeger et al. | 442/347 |
| 5,620,669 | 4/1997 | Plinke et al. | 428/36.2 |
| 5,814,405 | 9/1998 | Branca et al. | 428/311.51 |
| 5,891,402 * | 4/1999 | Sassa et al. . | |
| 5,997,829 * | 12/1999 | Sekine et al. . | |

FOREIGN PATENT DOCUMENTS

| | | |
|---|---|---|
| 3633214 A1 | 3/1988 | (DE) . |
| 29816749 | 2/1999 | (DE) . |
| 4-219124 | 8/1992 | (JP) . |
| 8-196830 | 8/1996 | (JP) . |
| 08-252305 | 2/1997 | (JP) . |
| 9-155123 | 6/1997 | (JP) . |
| 9-220466 | 8/1997 | (JP) . |
| 10-230119 | 9/1998 | (JP) . |
| 10-230119 | 12/1998 | (JP) . |

OTHER PUBLICATIONS

PCT International Search Report for PCT/US00/25776 (2 pages).

* cited by examiner

Primary Examiner—Steven P. Griffin
Assistant Examiner—Christina Ildebrando
(74) Attorney, Agent, or Firm—Carol A. Lewis White

(57) ABSTRACT

The present invention is an improved active filter material for use in removing target species such as $NO_x$ from a fluid stream. The filter of the present invention employs chemically active particles attached to a porous substrate by means of a polymer adhesive. A microporous layer is attached to at least one side of, or within, the porous substrate. The resulting filter material removes contaminates, such as dust, from the filter stream before the dust can clog active catalytic sites, as well as remove undesirable species by means of catalysis or reaction.

23 Claims, 6 Drawing Sheets

CHEMICALLY ACTIVE FILTER MATERIAL

FIELD OF THE INVENTION

The present invention relates to improved chemically active filtration materials which can remove undesirable species from a fluid stream.

BACKGROUND OF THE INVENTION

Active filters are employed for a variety of fluid filtering applications. The term "filter," as used herein, is intended to encompass any device that blocks, traps and/or modifies particles or molecules passing through the device. The use of the term "fluid" in the present invention is intended to encompass any form of readily flowing material, including liquids and gases. The term "active" shall mean that the filter is capable of action upon one or more components, or "target species," of a fluid stream, whether by catalysis, reaction, or some combination thereof, so that a modified specie(s) is formed. Typically, these filters combine an active material, such as a catalytic material (e.g., $TiO_2$, $V_2O_5$, $WO_3$, $Al_2O_3$, $MnO_2$, zeolites, and transition metal compounds and their oxides) and/or reactive material (e.g., sodium hydroxide, etc.) within a matrix. As the fluid passes over or through the matrix, target species within the fluid will react with active sites of the active material to convert the target species to a more desirable by- or end-product, and therefore remove the target species from the fluid stream. The term "active site," as used herein, describes a location on the active material where interaction with a target species occurs. Examples of such include:

| Target species | Active Material | Resulting Product(s) |
| --- | --- | --- |
| $NO_x$, $NH_3$ | $TiO_2$, $V_2O_3$, $WO_3$ | $N_2$ + $H_2O$ |
| CO | $Al_2O_3$, Pt | $CO_2$ |
| Dioxin/Furan | $TiO_2$, $V_2O_3$, $WO_3$ | $CO_2$, HCl, $H_2O$ |
| $O_3$ | $MnO_2$ | $O_2$ |
| $CO_2$ | Na(OH) | $Na_2CO_3$ |

Examples of previous attempts to produce a catalytic filter device include those set forth in U.S. Pat. Nos. 4,220,633 and 4,309,386, to Pirsh, where filter bags are coated with a suitable catalyst to facilitate the catalytic reduction process of $NO_x$. In U.S. Pat. No. 5,051,391, to Tomisawa et al., a catalyst filter is disclosed which is characterized in that catalyst particles which are made of metal oxides with a diameter of between 0.01 to 1 um are carried by a filter and/or a catalyst fiber. In U.S. Pat. No. 4,732,879, to Kalinowski et al., a method is described in which porous, preferably catalytically active, metal oxide coatings are applied to relatively non-porous substrates in a fibrous form. In patent DE 3,633,214 A1, to Ranly, catalyst powder is incorporated into multilayered filter bags by inserting the catalyst into the layers of the filter material. Further examples to produce catalytic filter devices include those set forth in JP 8-196830, to Fujita et al., in which a micropowder of an adsorbent, reactant, or the like is supported in a filter layer interior. In JP 9-155123, to Sasaki et al., a denitrification layer is formed on a filter cloth. In JP 9-220466, to Kaihara et al., a catalyst filter is made by impregnating a cloth of glass fibers with titanium oxide sol which is then heat treated and further impregnated with ammonium metavanadate. In JP 4-219124, to Sakanaya et al., a compact, thick, and highly breathable filter cloth is filled with catalyst for the bag filter material in order to prevent catalyst separation. In U.S. Pat. No. 5,620,669, to Plinke et al., the filter comprises composite fibers of expanded polytetrafluoroethylene (ePTFE) having a node and fibril structure, wherein catalyst particles are tethered within the structure.

In most cases of the above-mentioned patents (e.g., in JP 9-155123, JP 9-220466, JP 4-219124 and U.S. Pat. Nos. 4,220,633 and 4,309,386), the filters are capable of collecting substantial amounts of dust, such as that generated in a combustion process. Conventionally, after short collection times (on the order of minutes to hours), a layer of collected dust on the dirty side of the filter material increases the pressure drop across the filter, and the filter has to be cleaned (in many cases in situ). During this cleaning cycle (e.g., a high energy air impulse system, a shaker system, a reverse air system, etc.), the outer dust layer falls off and a new filtration cycle can begin. During the operational process, two main problems can occur, namely chemical deterioration and mechanical deterioration.

With chemical deterioration, the chemical function of the filter can be rendered useless due to contamination, which is a serious problem with virtually every previous active filter device, and especially for catalytic filter devices. Although, by definition, catalysts are not consumed during the catalytic reaction, catalytic filters may have limited operating lives due to particle, liquid, and gaseous contamination from a fluid stream (i.e., fine dust particles, metals, silica, salts, metal oxides, hydrocarbons, water, acid gases, phosphorous, alkaline metals, arsenic, alkali oxides, etc.). Deactivation occurs because the active sites on the active particles are physically masked or chemically altered. Unless these contaminants can be shed from the filter, the filter will rapidly diminish in efficiency until it must be replaced.

As has been noted, a variety of cleaning apparatus exist to remove dust from filters (e.g., shaker filter bags, back-pulse filter bags and cartridges, reverse air filter bags, etc.), but these devices are not particularly effective at removing dust embedded inside the filter material.

Another need in catalytic filtration is to protect the active sites on the active particles from condensing fluids. These fluids, which often are heavily contaminated with heavy metals, can condense on the surface of filter materials during the normal operation, particularly such as in the case of combustion plants. If these liquids come into direct contact with the active material, they can severely contaminate the active sites and render those sites less active.

Another form of chemical deterioration is due to the loss of inserted active particles during operation. The active particles in many instances are not attached strongly enough to the host fibers to withstand the rigors of normal operation. The active particles fall out of the filter, thereby not only diminishing filter effectiveness, but also contaminating the clean fluid stream.

With respect to mechanical deterioration, the mechanical function of the filter can deteriorate by abrasion of the filter fibers during operation or by penetration and collection of dust contaminates in the filter. Another mechanical failure is due to dust particle break-through which occurs with certain of the filters in the art cited above. This phenomenon can be observed especially during the cleaning cycles in which particles slowly migrate through and out of the filter medium due to rigorous filter cleaning.

Further, the mechanical function can be hindered when high active particle loadings of the substrate increase the pressure drop of the filter excessively and/or the filter material becomes too stiff to be handled.

Most prior art publications describe products which in some way address the chemical deterioration. In some patents (e.g. JP 9-155123), the catalyst layer is located on the downstream side of the filter, thus avoiding exposure of the catalyst to particulate contamination. In other cases, such as JP 9-220466, it is recognized that the catalyst will decrease in activity due to particulate and chemical contamination and other such factors when the catalyst is used for an extended period of time. One anticipated disadvantage of this structure is that the effect of generation of active sites is negated when physical masking of the pores by gas stream contaminates renders the active sites in the pores useless.

In two cases, namely JP 8-196830 and U.S. Pat. No. 5,620,669, the contamination of the catalyst by particulate and gaseous contaminants is not believed to be a problem. Both of these filter materials have a protective layer to avoid such contamination. However, the material described in JP 8-196830 has several disadvantages. First, it is rather thick because of the thickness of the protective layer. One anticipated disadvantage of such a filter is that due to the thickness, it will be stiff and, thus, expected to be difficult to clean by traditional cleaning methods. In addition, the active particles of the described product are not mechanically attached to the fibers of the filter material. The zeta potential difference of the catalyst particles to the polymeric fibers is relied upon for the attachment mechanism. Attrition of the catalyst particles is described in the document.

Japanese Patent Application No. 10-230119, assigned to ABB Co., Ltd. is directed to a filter material formed by immersing fibers to be formed into a filter cloth in a liquid catalyst, drying the catalyst, molding the fibers into a filter cloth and applying a ethylene tetrafluoride resin continuous porous thin film to the filter cloth. The ethylene tetrafluoride resin film is relied upon to keep the catalyst from flaking off of the filter cloth. However, no mention is made as to how catalyst particles in regions which are not adjacent the thin film are kept from flaking off.

The only commercial filter material available to date which offers combined particulate and target species removal is taught in U.S. Pat. No. 5,620,669, described earlier. This filter combines the concept of catalyst particle protection by a microporous membrane and the incorporation of catalyst particles attached directly to nodes and fibrils for strong adhesion and low pressure drop. Unfortunately, this filter material can be rather complicated and expensive to manufacture.

Accordingly, it is a primary purpose of the present invention to provide an improved active filter material that is effective at catalyzing and/or chemically reacting target species of a fluid stream.

Another purpose is to provide a filter active material wherein the active particles are tethered to a porous substrate by at least one polymer adhesive selected from the group consisting of polytetrafluoroethylene (PTFE); fluoroethylene propylene (FEP); high molecular weight polyethylene ((HMW-PE)i.e., where the molecular weight is 1 million or greater); high molecular weight polypropylene ((HMW-PP) i.e., where the molecular weight is 1 million or greater); perfluoroacrylate (PFA); polyvinylidene fluoride (PVDF); a terpolymer of tetrafluoroethylene, hexafluoropropylene and vinylidene fluoride (THV); and polychloro trifluoro ethylene (CFE).

It is yet another purpose of the present invention to provide an improved active filter material that can be effectively cleaned, with minimum loss of activity of the active material, so that the filter material has an extended effective operating life.

It is yet another purpose of the present invention to provide a method of manufacturing an improved active filter material which has minimal effect on the activity of the active material contained within the filter material.

It is yet another purpose of the present invention to provide an improved active filter material that is easily and inexpensively manufactured.

These and other purposes of the present invention will become evident based upon a review of the following specification.

SUMMARY OF THE INVENTION

The present invention is an improved active filter material for use in removing target species found in a fluid stream. Removal can occur due to chemical reaction or catalytic reaction. In the case of active filter materials which operate through catalytic reactions, undesirable substances, such as $NO_x$, are converted into acceptable end-products, such as water and $N_2$, leaving the active filter unchanged throughout the reaction. The present invention differs from previous active filter products in a number of important aspects. Particularly, the filter comprises active particles that are adhered to a porous woven or non-woven substrate by a polymer adhesive, and optionally adjacent or within the substrate is at least one protective microporous layer. This protective microporous layer, preferably comprising a microporous membrane, is described in more detail herein. In a particularly preferred embodiment, the porous substrate comprises woven or non-woven expanded PTFE fibers and the protective layer comprises expanded PTFE. As used herein, the term "polymer adhesive" shall include at least one thermoplastic elastomer in the form of solid particles suspended in a liquid that is capable of forming strings and dispersion primary particles which tether the active particles to the substrate, as well as the resulting fixed form of the polymer adhesive. Suitable polymer adhesives include PTFE, FEP, HMW PE, HMW PP, PFA, PVDF, THV and CFE.

It was surprisingly found that binding active particles within a porous substrate through the use of one or more polymer adhesives still allows access to active sites on the particles from many sides by target species and does not appear to decrease appreciably the activity of the active particles in the filter as compared to the original unbonded active particles. Moreover, it was further surprisingly found that laminating a protective microporous layer to the substrate using polymer adhesive did not decrease appreciably the activity of the active particles.

An important feature of the active filter material of the present invention is that it provides high strength in combination with the intimate adhesion of the active particles to the filter material via the polymer adhesive. These attributes make the filter material ideal for use in demanding environments, such as with shaker bag, reverse air, or pulse-jet filter cleaning assemblies. In the preferred embodiment where the porous substrate comprises woven or non-woven expanded PTFE fibers, since expanded PTFE fiber material is quite strong and resistant to abrasion, it can readily withstand the flexing and rigorous handling of filter cleaning systems.

In addition, the filter material has excellent reactivity with the target species in the fluids. The path of the fluid passing through the filter is tortuous because minimal or no straight pores exist in the substrate, thus allowing good contact of fluid with the active sites as the fluid passes through the filter material.

To further improve the operative life of the present invention, it is preferred that at least one microporous layer be mounted on or within the porous substrate, most preferably on at least the upstream side (i.e., the side of filter which contacts the fluid stream to be filtered, as compared to the downstream side of the filter from which the filtered fluid stream exits the filter) of the active filter. As used herein, the term "microporous layer" is intended to refer to a layer having a thickness of at least 1 micrometer and having micropores on the order of 0.05 to 10 micrometers across. A particularly preferred microporous layer comprises expanded microporous PTFE membrane. This protective microporous layer separates dust particles and other contaminants from the fluid stream, and particularly when adjacent the upstream side of the filter, prevents dust particles from becoming embedded within the active portion of the filter. The result is that dust particles will form into a cake on the outside of the microporous layer. Thus, the protective layer not only protects the active particles from contamination by dust particles, but also removes dust particles from the fluid stream exiting the filter. Hydrophobic microporous membranes, such as ePTFE membranes, are particularly effective protective microporous layers against aqueous liquid-based contaminants. In cases in which a microporous expanded PTFE membrane is used on the upstream side of the filter, filter cleaning methods such as shaker, reverse air, and back-pulse, become especially effective for cleaning the filter because the dust will readily separate from the membrane surface due to its low surface energy. The enhanced cleanability allows enhanced filter life.

For some applications, it may also be useful to include more than one microporous layer, or even additional porous substrate filter layers, with or without a filler or other material, to provide additional levels of filtration. In such an embodiment, many more design parameters in the overall active filter material construction can be gained. By varying the number of layers, the location of the layers (e.g., upstream, within or downstream of the porous substrate) and the compositions of the layers, the filter materials can be made with varying properties, depending on the requirements of the desired application for the active filter material.

A number of unique process steps also distinguish the present invention. In a preferred process, active particles are combined with a polymer adhesive and then impregnated into a porous substrate. Particularly, the particles are attached to the substrate by the polymer adhesive; however, the polymer adhesive covers only small areas of the surface of the active particle, thus allowing the active particle to interact with target species when exposed to a fluid stream. The substrate is then attached to at least one microporous layer, preferably comprising at least one sheet of expanded PTFE. The microporous layer(s) may be placed on the upstream side of the porous substrate, sandwiched within the porous substrate, or located on the downstream side of the porous substrate. The microporous layer(s) serves to protect not only the active particles held on the substrate, but also the substrate itself, from particulate contamination in the fluid stream and from contamination or damage during installation, handling, etc.

This improved filter, as well as the unique manufacturing process, allows a wide range of filter parameters, such as active particle loading, filter thickness, filter permeability, flow field (i.e., volume within the filter which the gas to be filtered flows through) around the active particles to obtain excellent gas/catalyst contact, filter strength, active particle protection, filter pore size distribution and proximity, active particle size, active particle shape, and active particle surface area.

BRIEF DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved active filter material. With this filter, pollutant gas components, or "target species," such as dioxins, furans, $NO_x$, CO, and the like, can be removed from a fluid stream (i.e., catalyzed or otherwise reacted). In addition, particulates which may be present in the fluid stream can be collected with high efficiencies and, thus, do not interfere with the performance of the active particles in the filter. As well, the active filter material is effective in removing dust particles from the fluid stream exiting the filter.

The filter of the present invention comprises active particles attached to the substrate by means of a polymer adhesive. On at least one side of, or within, the substrate is a microporous layer which filters out particulates, such as fly ash and the like, from the liquid stream.

Figure 1:
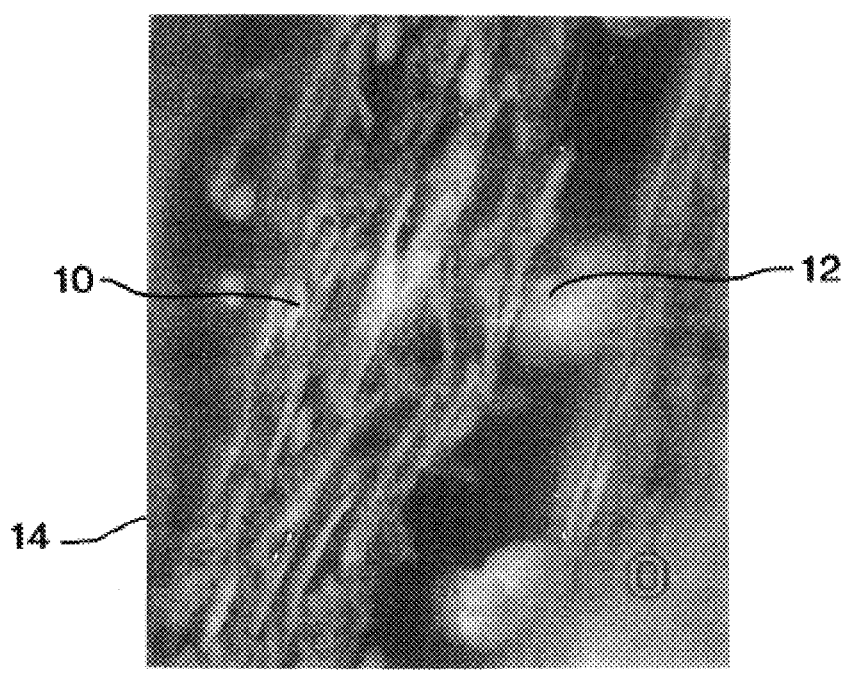
FIG. 1 is a photograph of the cross-sectional view of the filter material through an optical microscope showing catalyst particles attached by polymer adhesive to a fiber from the felt, enlarged 50 times.

FIG. 1 shows a cross-sectional view of a porous substrate of the present invention, photographed through an optical microscope, magnified about 50 times. The image shows a substrate of a needled felt of ePTFE fibers on an ePTFE scrim 12, and the impregnated active particles 14 which are held to the ePTFE fibers by polymer adhesive (not visible at this magnification). The catalyst particles are substantially uniformly distributed throughout the thickness of the felt.

Figure 2:
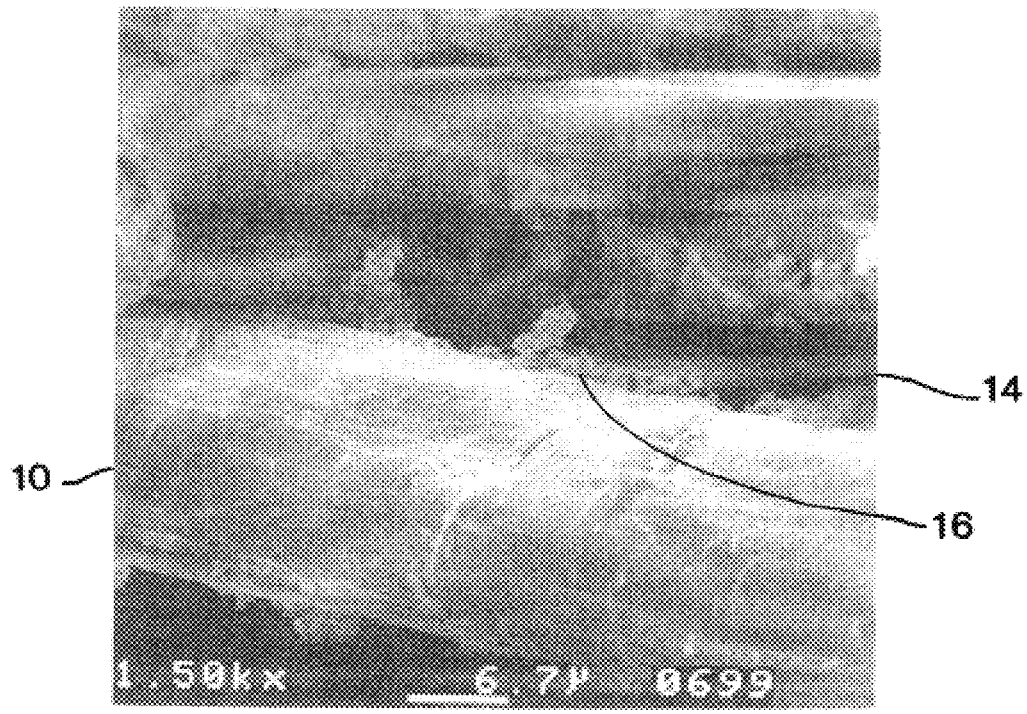
FIG. 2 is a scanning electron micrograph of active particles attached by polymer adhesive to the fiber of the substrate, an ePTFE felt, enlarged 1500 times.

FIG. 2 is a scanning electron photomicrograph of active particles 14 attached by polymer adhesive 16 to the fiber 10 of an ePTFE felt substrate, enlarged 1500 times.

Figure 3:
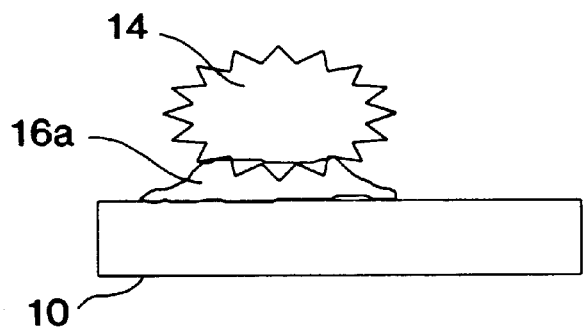
FIG. 3 is a schematic representation showing the polymer adhesive tethering and adhering between the active particle and the substrate.
Figure 4:
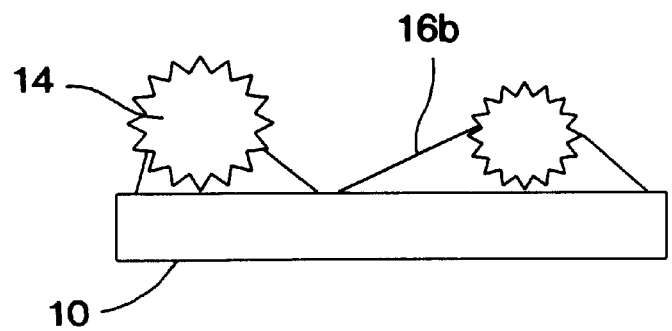
FIG. 4 is an alternative schematic representation of how the polymer adhesive tethers the active particle and the substrate.
Figure 4A:
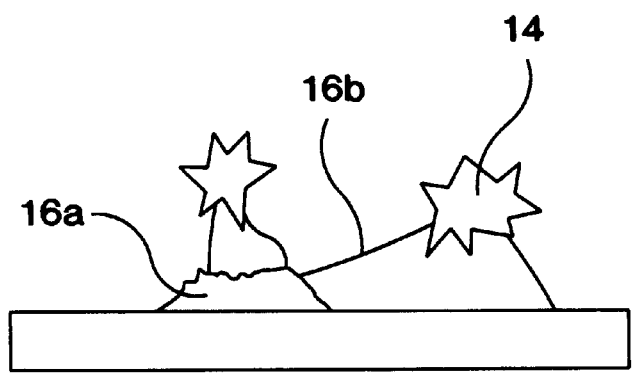
FIG. 4A is a further alternative schematic representation of how the polymer adhesive tethers the active particles and the substrate.

FIGS. 3 and 4 are schematic representations of two alternative ways in which the polymer adhesive may hold the active particles to the substrate (e.g., fibrous ePTFE felt, or the like). In FIG. 3, a particle 14 is attached to the substrate 10 by a dispersion primary particle (i.e., a single particle from the polymer adhesive dispersion) of polymer adhesive 16a. FIG. 4 shows a particle 14 attached to the substrate 10 by small polymer adhesive strings 16b. "Strings" are intended to define small polymeric strands (such as, on the order of a few microns or less in diameter). The strings 16b may optionally originate from a dispersion primary particle 16a such as shown in FIG. 4a.

Figure 5:
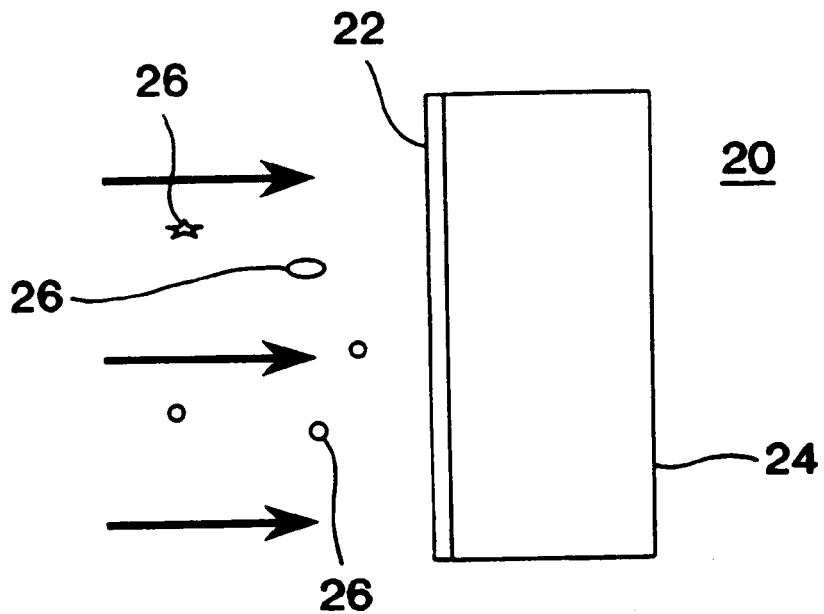
FIG. 5 is a side view cross-sectional schematic representation of one embodiment of an active filter material of the present invention.

FIG. 5 shows a side cross-sectional perspective view of an active filter material comprising a protective layer 22, in this embodiment a microporous membrane, attached to an impregnated porous substrate 24. In this preferred embodiment, the membrane 22 is located on the upstream side of the substrate 24, whereby the fluid stream (direction of flow represented by arrows in figure), including elements 26 (e.g., dust particles and pollutants) to be filtered, first contacts the membrane 22. To protect the active particles within the substrate 24 from contamination (such as from dust or other material blocking active sites), in the configuration shown, the microporous layer is laminated to the impregnated substrate. Dust particles and adsorbed pollutants which may be present on these dust particles are blocked by the microporous layer, thus preventing contact with the active particles attached to the porous substrate. This protective layer provides significantly improved protection of the active filter material and longer effective life as compared to a filter without a microporous layer.

While a variety of microporous layers may be employed, it is particularly preferred to employ an expanded PTFE membrane, such as that described in U.S. Pat. Nos. 3,953,566, to Gore, 5,476,589, to Bacino, and 5,814,405, the subject matter of these patent being specifically incorporated by reference herein, due to its exceptional filtration properties. Expanded PTFE (ePTFE) in the form of a membrane has a number of desirable properties which makes it a particularly desirable filtration material. For example, ePTFE has many microscopic holes or "micropores", such as on the order of 0.05 to 10 $\mu$m across, which allow fluid molecules to pass through but restrict the passage of particulates, such as fine dust and the like. Additionally, the surface of an expanded PTFE membrane can be readily cleaned of accumulated contaminants, vastly improving the operative life of the filter.

A preferred material of the present invention is made in the following manner. A porous substrate is provided having a suitable pore size to permit impregnation of active particles and polymer adhesive into the porous structure. By "particles" it is meant a material having any aspect ratio and thus includes flakes, fibers and spherical and non-spherical powders. A slurry of active particles and polymer adhesive flows unaided or aided by mechanical means into the porosity of the substrate. The amount of polymer adhesive is chosen so that there is sufficient adhesive to hold the particles to the substrate, but only a minimal amount of adhesive covers the surface of the active catalyst particles, thereby maximizing the reactivity of the active particles. Alternatively, the active particles and polymer adhesive may be incorporated into the substrate during formation of the porous substrate structure, such as by mixing the substrate component, active particles and polymer adhesive to form a coherent porous structure. As a further alternative, the active particles may be added to the substrate before or after the polymer adhesive is incorporated within the porous substrate.

The impregnated substrate is then provided with at least one microporous layer, such as a microporous membrane, within the porous substrate, on the downstream side of the substrate, or most preferably on the upstream side. This protective layer may be attached, either continuously or discontinuously, such as by means of lamination, welding, sewing, tacking, clamping, or other suitable attachment means. The protective microporous layer may optionally be configured so that it can also be removed and replaced, as needed, without disturbing the rest of the filter.

Suitable particles are those which catalyze or otherwise react with target species from the fluid stream. Suitable catalytic particles may include noble metals, non-noble metals, metal oxides (including transition metals and transition metal compounds), as well as alkali and alkaline earth, their oxides and carbonates. Preferred catalyst particles may include particles such as titania, alumina, silica and zeolites which have active surfaces thereon selected from noble metals (e.g., Pt, Pd, Au, and Rh including compounds thereof), vanadia, transition metal(e.g., Fe, Cu and Al, including compounds thereof). A particularly preferred catalyst comprises $V_2O_5$ on the anatase form of titanium dioxide. Examples of particles that otherwise react include, but are not limited to, sodium hydroxide and activated carbon treated with salts such as sodium carbonate, potassium iodide, and the like. The foregoing recitation is not meant to be exhaustive; rather, other suitable catalysts and reactive particle may be employed as well. Moreover, it is important to realize that a given type of reactive particles may act differently in different environments, i.e., sometimes acting as a catalyst and other times as a reactive material. In addition to the active particles, depending on the desired result, it may be desirable to include other optional particles, such as adsorbents, etc., in the devices of the present invention.

The active particles are included in the filter in an amount that will provide a wide range, such as up to 70% by weight, or higher, and preferably 10% to 30% by weight, in the substrate in relation to the final composite material (not including air content).

Active particles suitable for the present invention tend to be small, i.e., ordinarily less than 40 microns in size. The preferred size depends on the pore size of the substrate used and on the activity to size relationship of the active particle used.

The porous substrate may be any material which maintains the integrity of the filter and is the matrix to which the particles and microporous layer(s) are attached. Suitable examples include woven and non-woven fabrics, sheets or membranes, open-cell foams, sintered particulate structures or fibrous/particulate networks held together by binder or sintering.

One preferred porous substrate comprises ePTFE in the form of a membrane, or even more preferably as fibers which are either woven or nonwoven. It should be appreciated that the pore size of the ePTFE may be varied dramatically within the scope of the present invention, ranging from less than 0.05 $\mu$m to over 100 $\mu$m across. One particularly preferred porous substrate is a nonwoven felt made of needled ePTFE fibers having a density of 300 to 900 grams per meter squared and air permeability of 9 to 26 m/min at 12 mm water gauge.

The polymer adhesive of the present invention binds the structure together. It attaches the active particles to the substrate and can, optionally, attach the protective layer to the impregnated substrate. Suitable polymer adhesives include polytetrafluoroethylene (PTFE), fluoroethylene propylene (FEP), high molecular weight polyethylene (HMW-PE, where the molecular weight is 1 million or greater) and high molecular weight polypropylene (HMW-PP, where the molecular weight is 1 million or greater); perfluoroacrylate (PFA); polyvinylidene fluoride (PVDF); a terpolymer of tetrafluoroethylene, hexafluoropropylene and vinylidene fluoride (THV); and polychloro trifluoro ethylene (CFE). The composition of the polymer adhesive and the porous substrate may be the same or it may be different.

The polymer adhesive can be slurried with the active particles before penetrating into the substrate or it can be added to the substrate prior to the active particles, or after the active particles. The polymer adhesive is then fixed so as to attach the particles to the porous substrate. As used herein, the term "fixed," or "fixing," is intended to refer to drying to remove volatiles, heating, curing or melt-flowing. The content of the polymer adhesive solids in the final composite can be from 1 to 90% by weight, and preferably 5 to 10% by weight.

It was surprisingly found that a microporous layer could be laminated or otherwise attached to the active layer without affecting the activity of the active particles. As mentioned earlier herein, proper selection and combination of the substrate, polymer adhesive, particles, and microporous layer is essential to maintaining functionality. Examples of suitable microporous layers include, but are not limited to, microporous ePTFE membranes, other polymeric (organic or inorganic) membranes, multi-layer membranes, filled membranes, asymmetric membranes, and other nonwoven or woven materials, and open cell foams.

Preferred filter materials of the present invention have an air permeability of at least 0.1 m/min at 12 mm water gauge, a final weight of approximately 100 to 3000 g/m$^2$, and a thickness of approximately 0.1 to 100 mm.

Figure 6:
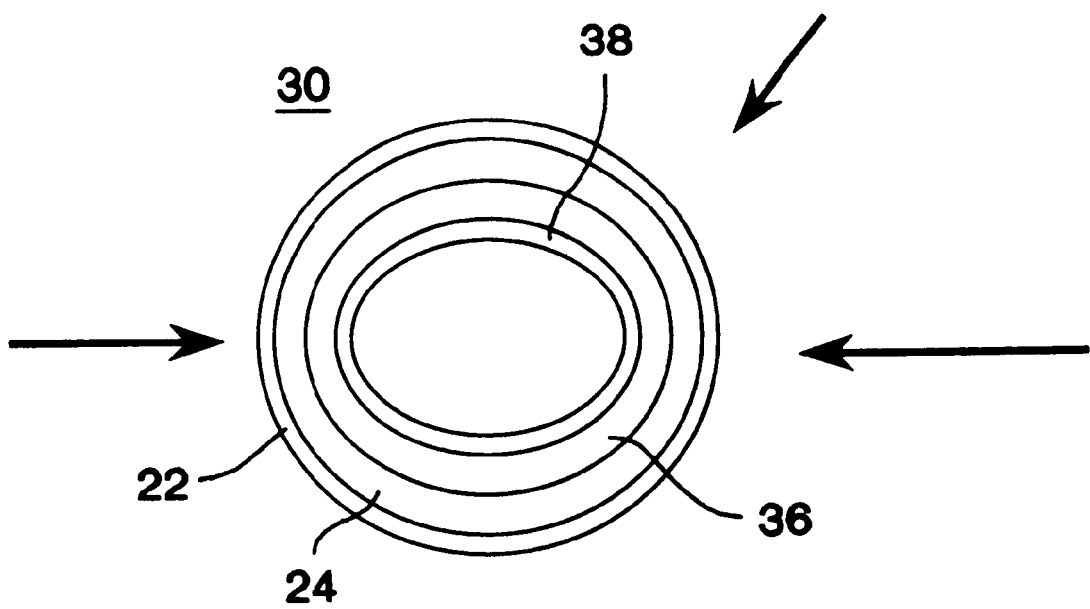
FIG. 6 is a top view cross-sectional schematic representation of another embodiment of an active filter material of the present invention.

FIG. 6 shows a top perspective cross-sectional view of a cylindrical filter 30, such as a filter bag. This figure depicts extended filtration capability to that shown in FIG. 5. The microporous layer 22 is provided on the upstream side (as depicted by the direction of the arrows) of a first impregnated porous substrate 24, which is adjacent a second impregnated layer 36 having active particles of a different function than substrate 24, and yet a third impregnated layer 38 with a third type of active particle and function. This configuration may alternatively be provided as a cartridge filter, in either an unpleated or pleated configuration.

As shown in the embodiment of FIG. 6, it is possible to include more than one type of active particle, either in the same layer or in adjacent layers. These adjacent layer(s) can have either the same or different substrate materials. Depending on the desired function and space considerations of a given system, two or more types of active particles can be added either to the same substrate or to adjacent substrate layers that are of the same or different composition. For example, catalyst particles and reactive particles can be incorporated in the same substrate to perform two different functions. In another example, the active particles can be in different layers, e.g., the reactive particles in a polyurethane open cell foam and in an adjacent layer the catalyst in an ePTFE felt. These examples can be further varied by using different polymer adhesives, which may be chosen depending on the desired performance (temperature, activity, etc.) of the filter.

It should be appreciated that there are numerous permutations of filter materials that can be made in accordance with the present invention. Among the combinations of material contemplated by the present invention are: (1) providing on the upstream side, within or on the downstream side at least one microporous layer, such as one or more layers of ePTFE membrane; (2) providing active particles of differing compositions within a given porous substrate; (3) constructing a filter with multiple layers of porous substrates of the same or differing compositions (i.e., porous layer composition, active particle composition, polymer adhesive composition); etc.

Figure 7:
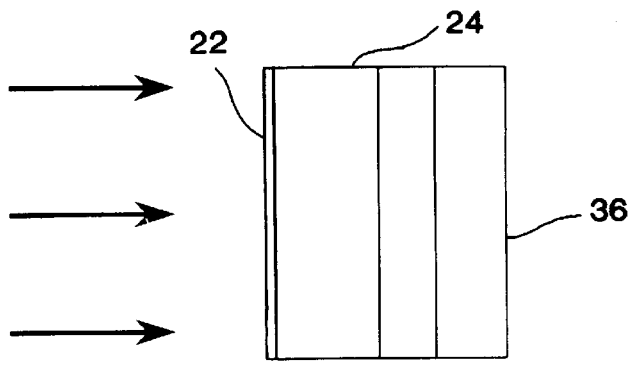
FIG. 7 is a side view cross-sectional schematic representation of still another embodiment of an active filter material of the present invention.

FIG. 7 shows a side cross-sectional view of a filter material of the present invention. The microporous layer 22 is provided on the upstream side (as depicted by the arrows) of a first porous substrate 24, which is adjacent a second porous substrate 36. These active layers can be of different substrate, polymer adhesive, and active particles, the combination of which suits the specific application.

In one particularly preferred embodiment of the present invention, a filter may be provided which is particularly suited for use in treating pollutant gases, other target species, and particulates from the fluid stream therein. For instance, by employing a catalyst of $TiO_2$, $V_2O_3$, and $WO_3$, pollutants of NO, $NO_2$, and $NH_3$ will readily be modified into $H_2O$ and $N_2$ in the presence of oxygen.

Figure 8:
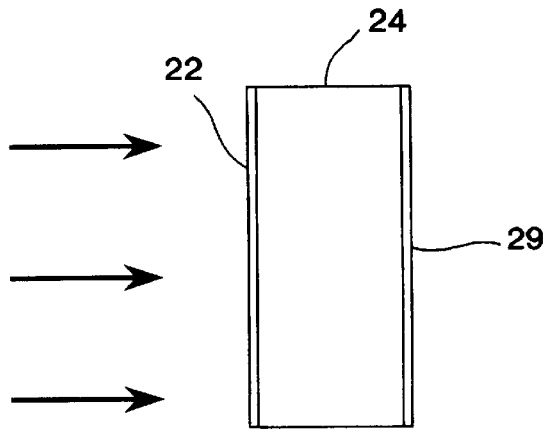
FIGS. 8 and 8A are side view cross-sectional schematic representations of other embodiments of an active filter material of the present invention.

FIG. 8 shows a side cross-sectional view of another filter material of the present invention. It comprises a microporous layer 22 located upstream of the porous substrate 24. A second microporous layer 29 is located downstream of the porous substrate 24.

Figure 8A:
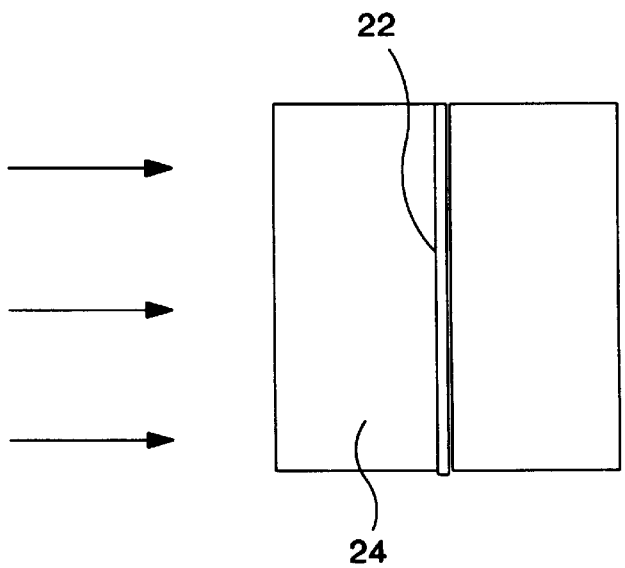

FIG. 8A shows a further embodiment in which a microporous layer 22 is provided within the porous substrate 24.

Figure 9:
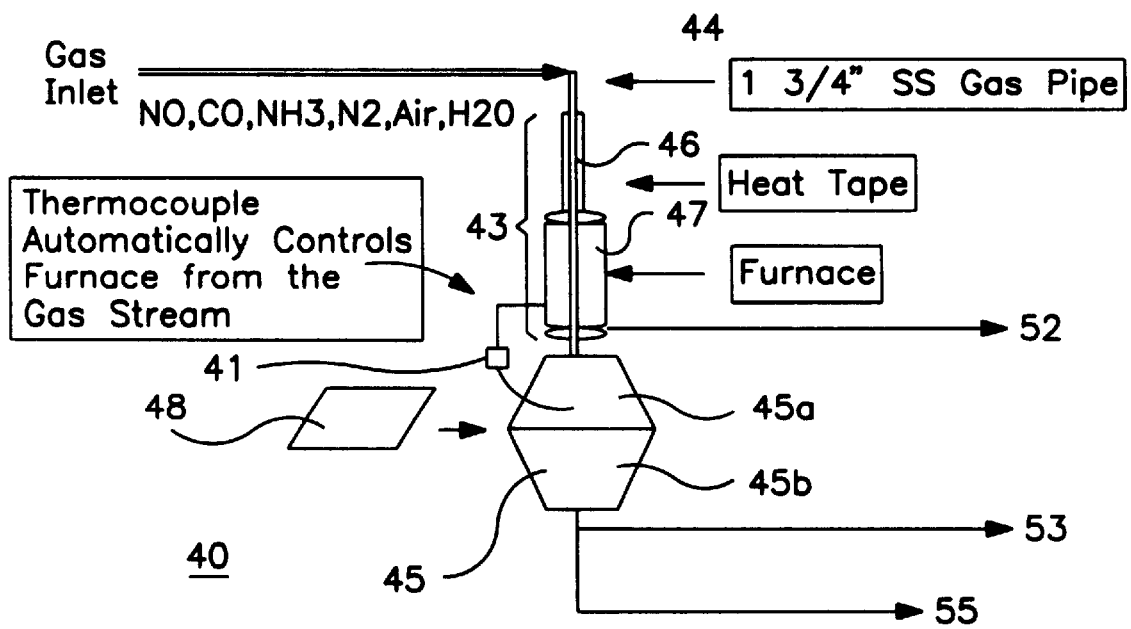
FIG. 9 is a side view cross-sectional schematic of a reactor assembly which measures $NO_x$ conversion efficiency and FIG. 9A shows the detail of the filter material sample placed in the sample holder of the reactor assembly.

FIG. 9 is a schematic representation of a reactor system which was used to measure $NO_x$ reduction of filters made in accordance with the present invention. Chemical reactivity was tested in this vertical flow reactor system 40, with a filter sample sampling area measuring 4.5×4.5 inch (11.4×11.4 cm) square. The system 40 consisted of three sections: the gas supply, reactor, and analyzer. The gas inlet manifold 44 supplied four different gases for $NO_x$ reaction: nitric oxide (from BOC Company of Riverton, NJ, 20% NO in nitrogen, less than 2000 ppm of other nitrogen oxides), ammonia (from BOC Company, 20% ammonia in nitrogen), high purity nitrogen from a nitrogen generator (Whatman, Haverhill, Mass., Model #75-78, operating pressure 100 psi, nitrogen purity >99.5%), and air from an on-site compressed air supply (moisture removed through a dryer, hydrocarbons removed by a on-line active carbon bed). The flow rate of each gas was controlled by a mass flow controller (Brook Instruments of Hatfield, Pa., Model #5850i) (not shown). Quarter inch stainless steel tubing was used to connect each gas cylinder to the mass flow controller.

Figure 9A:
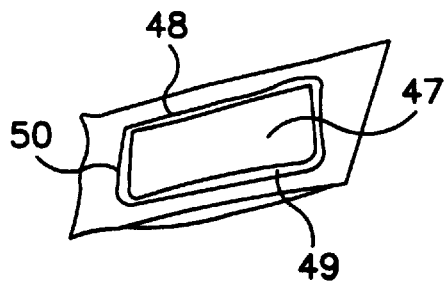

The reactor assembly consisted of a section 43 to preheat the gas (a pipe 24 inch in length, ¾ inch outside diameter, ½ inch inside diameter) and the reactor body 45. The first half of the preheat section 43 was heated by heating tape 46, which was controlled by a temperature controller (Omron of Schaumburg, Ill., Model #E5CJ), and the heating rate was 20° C./min. The second half of the preheat section 43 was heated by a furnace 47, where the temperature and heating rate was controlled by a second temperature controller (Omron, Model #E5CJ). The heating rate was 10° C./min. Downstream of the preheating section 43 was the reactor body 45. The reactor body 45 was made of stainless steel, and the sample holder 48 was located between upper and lower halves 45a, 45b of the reactor body 45. The top of the upper half of the body 45a had dimensions of 2.5 by 2.5 inch square, the bottom of the upper half of the body had dimensions of 4.5 by 4.5 inch square, and the distance between the top and bottom of the upper half of the body was 4 inches. The dimensions for the lower half of the body 45b were identical, simply reversed. A sample holder 48 (4.5× 4.5×0.125 inch, stainless steel) was located between the upper body and the lower body. FIG. 9A shows the configuration of the sample 42 in the sample holder 48. Particularly, a PTFE gasket 49 (4.5×4.5×0.125 inch) was set on top of the sample holder 48, and the sample 42 was sandwiched between gasket 49 and another PTFE gasket 50, as shown. The lower body 45b was connected to a gas flow meter (not shown) which measured the flow rate of the gas. The upper and lower bodies 45a, 45b were heated by temperature controllers (not shown) where the heating rate was 10° C./min, The gas temperature of each of the inlet gas and the outlet gas were controlled to be within 2° C. of one another. Gas sampling ports 52 and 53, above and below the sample 42, respectively, were provided to measure the inlet and outlet gas concentrations to determine conversion efficiency. Exhaust 55 was provided to vent residual gas.

During operation, the sampled gas was analyzed in the gas analysis section, which consisted of a gas conditioning system, an NO analyzer Siemens, Alpharetta, Ga., Model # Ultramat 5E), and an oxygen analyzer (Siemens, Model # Ultramat 21/$O_2$). Prior to entering the gas conditioning system, three liters of gas flowed through an acid scrubber which contained three liters of phosphoric acid (pH=1) to remove ammonia from the gas stream. The three liters of gas were then pumped into the gas conditioning system for moisture and $NO_2$ removal, after which the gas was divided into two parts: two liters of gas were drawn into the oxygen analyzer and one liter of gas was drawn into the NO analyzer simultaneously. Both NO and oxygen analyzers were calibrated prior to sample gas measurement.

Figure 10:
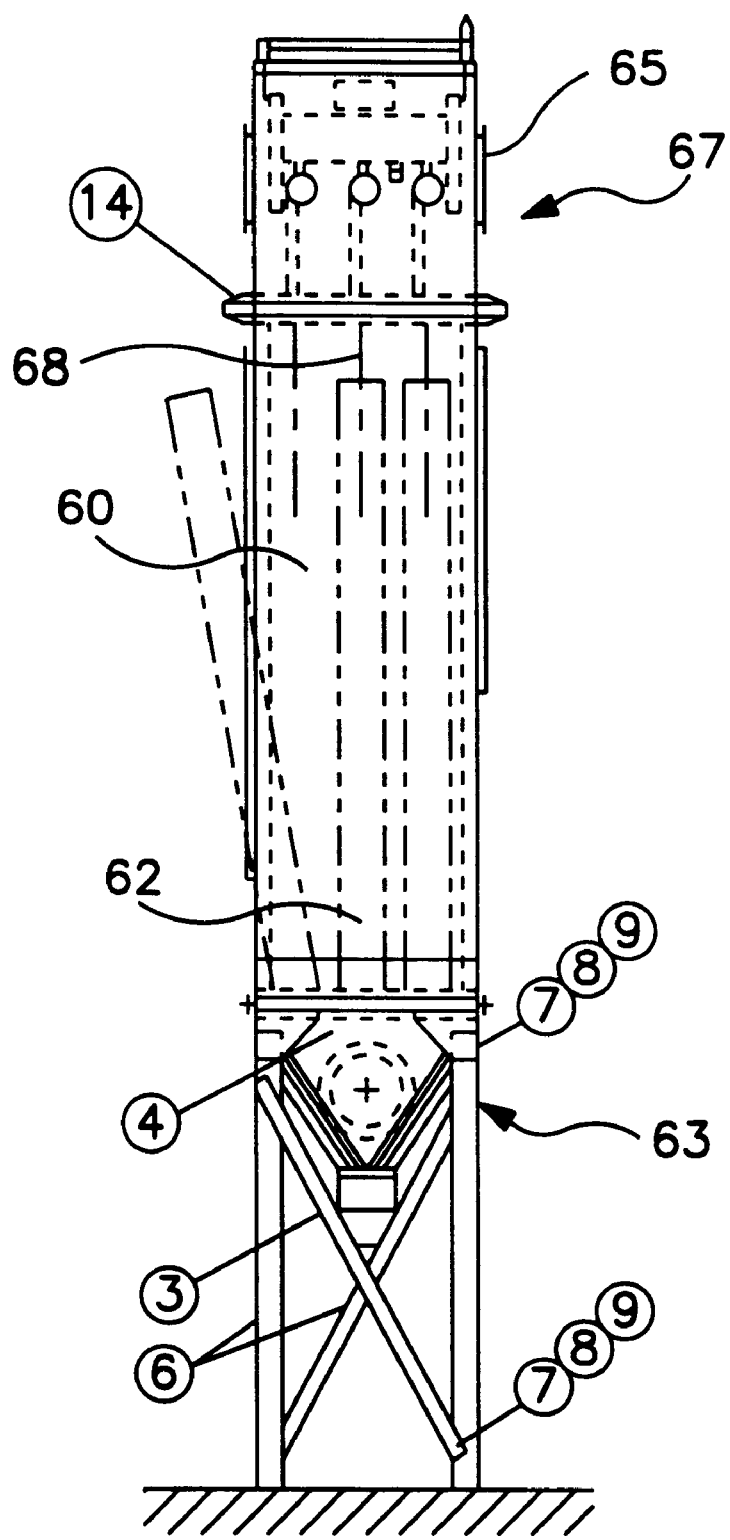
FIG. 10 is a side view cross-sectional schematic of the equipment used to determine particle loss.

FIG. 10 is a schematic representation of equipment used to measure particle loss of the filters of the present invention. The equipment used to test for particle loss was a pilot pulse jet bag house made by Pneumafil, Part No. 6-17273, having the following basic components: dust collector 60 which contained the filter elements 62, airflow inlet 63 and discharge 65, and pulse jet manifold 67. The equipment accepted nine filter elements 62 in a 3×3 grid with three pulse pipes 68 cleaning three elements each. In this test, three elements were used for filter bags, all on different pulse pipes, and the rest of the elements were plugged. The pulse jet cleaning parameters were as follows: pulse pressure of 40 and 80 psi, pulse duration of 0.05 second, pulse interval per row of 30 seconds, pulse pipe hole of size 0.25, pulse pipe diameter of one inch, pulse pipe height of 5 inch above tube sheet, airflow of 200–2000 cubic feet per minute at 10 inch water gauge. The filter cages on which the filter bags were attached were 60 inch length bottom load cages (Flex-kleen Research—Cottrell Flex-kleen Corporation, Itasca Ill.). The differential across the tube sheet was negative.

The combination of the four components of the active filter material of the present invention, namely the active particles, polymer adhesive, substrate, and microporous layer, can be applied in a broad range of applications, as shown in the examples provided below. The active filter material may be incorporated into filter bags, filter panels, such as flat or pleated flat filter panels, or pleated or unpleated filter cartridges, depending on the desired application. One field where this invention may have particular benefit is in industrial fluid gas cleaning of emissions from stationary sources. However, it is contemplated that the present invention may be utilized in virtually any filtration application where action upon a target species (whether catalysis, reaction or some combination) in a fluid stream is desirable.

Without intending to limit the scope of the present invention, the examples provided below illustrate how the present invention may be made and used.

EXAMPLE 1

A filter material of the present invention, comprising 22 weight percent catalyst as active material, 9 weight percent polymer adhesive and 68 weight percent substrate, was fabricated in the manner described below, and the $NO_x$ conversion of the filter material was measured.

A felt substrate material of needled expanded PTFE fibers was obtained measuring 2 feet (61 cm) by 1 foot (30.5 cm), 1.5 mm thick, and weighing 158.78 g with an air permeability in the range of 9–26 m/min at 12 mm water gauge (W.L. Gore & Associates, Inc., Elkton, Md.). A slurry was prepared comprising 63 ml of a 29 percent by weight polymer adhesive solution (fluorinated ethylene propylene (FEP) aqueous dispersion, diluted from that sold as T120 by DuPont, Wilmington, Del.), 187 ml of de-ionized water and 50.75 g of catalyst (3% $V_2O_5$ on $TiO_2$, 0.5 micron average diameter, sold in extrudate form as S096, CRI, Houston Tex.), which was magnetically stirred for 22 minutes.

The slurry was poured over a surface of the felt substrate material and was uniformly distributed over the surface of the substrate by sliding with a spatula. The substrate was then flipped over to expose its other surface, and the procedure was repeated until all of the slurry was absorbed into the substrate. The impregnated felt was then mounted on a pin frame and baked at 220° C. for 18 minutes.

The filter material comprising the impregnated felt had a measured air permeability of 4.2 m/min at 12 mm $H_2O$.

A layer of porous expanded PTFE membrane having a thickness of approximately 10 microns with an air permeability ranging between 4.6 and 5.4 m/min at 12 mm water gauge was then laminated to the impregnated felt. Particularly, the material was subject to heating above the melt temperature of the FEP, and pressure was applied for between $10^{-3}$ and $10^{-5}$ seconds to permit softening of the FEP and permit bonding of the membrane to the impregnated felt. The resulting fabric laminate had good bond strength between the porous expanded PTFE membrane and the felt, and an air permeability of 1.0 m/min at 12 mm water gauge.

The reactor described and shown in FIG. 9 was used to measure the $NO_x$ conversion efficiency. Particularly, a 4.5 inch (11.4 mm) square sample of filter material was placed in the sample holder with a gasket on either side as shown in FIG. 9A, and the sample holder was placed in the reactor. The nitrogen and air mass flow controllers were set to achieve a space velocity of 0.275 $m^3$/hour/g of catalyst, and the reactor was checked for leaks around the sample holder. The temperature controllers for the heating tape, furnace, upper body and lower body were set to 250° C., 216° C., 340° C., and 310° C., respectively. When the temperature reached the set points, the sample was tested by flowing nitrogen and air at the set temperature of 216° C. for 2 hours. After the sample treatment with nitrogen, the mass flow controllers for NO, ammonia and $N_2$ were turned on to concentrations of 396 ppm for NO, 400 ppm for ammonia, 6%(vol.) for oxygen (from air), and the balance $N_2$. The NO and oxygen concentrations from the inlet gas and outlet gas were measured. The measurements were stopped when the inlet and outlet concentrations read from the analyzers did not change for 10 minutes. A reference sample was first measured to ensure that the condition of the system had not changed. The $NO_x$ conversion efficiency was 76.8%. This conversion efficiency is calculated as $$\text{Conversion efficiency (\%)} = \frac{100 \times (\text{inlet concentration} - \text{outlet concentration})}{\text{inlet concentration}}.$$

EXAMPLE 2

A filter bag, comprising 20 weight percent catalyst, 10 weight percent polymer adhesive and 70 weight percent substrate, was fabricated in the manner described below, and the loss of the catalyst particles of the filter was measured.

A felt substrate material of needled expanded PTFE fibers having an average air permeability of 9 to 26 m/min at 12 mm water gauge (W.L. Gore & Associates, Inc.) was sewn into a bag of diameter 8.5 inches, thickness 0.6 inches, length 62 inches, and weight 581.13 g. A slurry was prepared comprising 144.64 ml of a 57 percent by weight polymer adhesive solution (fluorinated ethylene propylene (FEP) aqueous dispersion, sold as T120 by DuPont, Wilmington, Del.), 482.95 g of deionized water and 166.34 g of catalyst (3% $V_2O_5$ on $TiO_2$, 0.5 micron average diameter, sold in extrudate form as S096, CRI, Houston Tex.), which was magnetically stirred for more than 5 minutes.

The slurry was poured on the inside and outside surfaces of the felt substrate material and was uniformly distributed over the surface of the substrate by repeatedly rolling and unrolling the material, and while also pulling the bag inside out and right side out repeatedly. The procedure was repeated until all of the slurry was absorbed into the substrate. The impregnated filter bag was then hung inside an oven and baked under the following temperature profile: 70 minutes at 150° C., 83 minutes to increase oven temperature from 150° C. to 250° C., and 7 minutes at 250° C. after which the heat was turned off and the bag was cooled in the oven 14.5 hours at which time it was removed.

The bag was then put inside a pilot pulse jet bag house as described and shown in FIG. 10. The operational procedure used is described as follows. Before the test began, the bags were installed as shown, the system was cleaned to allow only negligible dust, and the post filter was cleaned so that the pressure drop was less than 2.0 inch water gauge. Fan mode was set to automatic, and the pressure drop across the tube sheet ranged from 1.5 to 3.0 inches of water. The cleaning mode was set at automatic, pulse on time was 0.25 seconds and pulse off time was 2 seconds. The test was then begun.

A dust free air stream impinged the impregnated filter bag which was tightly fit on a filter bag cage. The pulse pressure was regulated so that the bag experienced pulses at 40 psi for about 47,400 pulses and then at 80 psi for about 35,000 pulses, for a combined total of nearly 83,000 pulses. The weight of the bag was measured four times, before pulsing, after about 13,600 pulses, after about 47,400 pulses, and when the test was complete. The bag after testing appeared visually the same as when it started, i.e., clean with no signs of wear. At no time was there any weight loss, which would indicate the loss of catalyst particles.

EXAMPLE 3

An impregnated felt material, comprising 41 weight percent catalyst, 23 weight percent polymer adhesive and 36 weight percent substrate, was fabricated in the manner described below.

A non-woven conventional air conditioning filter pad substrate (Purolator room air conditioner filter pad, part number 191773, of Henderson, N.C.) was obtained measuring 7.25 inches by 7 inches, 0.25 inches thick, and weighing 3.76 g. A slurry was prepared comprising 22.08 g of a 24.1 percent by weight polymer adhesive solids (polytetrafluoroethylene, PTFE, aqueous dispersion, sold by DuPont, Wilmington, Del.), 57.08 g of de-ionized water and 9.5 g of catalyst (3% $V_2O_5$ on $TiO_2$, 0.5 micron average diameter, sold in extrudate form as S096, CRI, Houston Tex.), and 2 g of isopropyl alcohol (IPA) which was magnetically stirred.

The substrate was sprayed with IPA and the slurry was poured over the surface of the pre-wet substrate. Excess slurry was poured again over the substrate. This was repeated several times for uniform distribution.

The impregnated sample was then hung at room temperature and dried overnight. The sample was then dried at 140° C. for 15 minutes and cooled to 125° C. over 15 minutes and removed from oven. The air permeability was greater than that measurable on the equipment, which had a measurement limit of 61 m/min at 12 mm water gauge.

AIR PERMEABILITY—Frazier Number Method

Air permeability was measured by clamping a test sample in a gasketed flanged fixture which provided a circular area of approximately 2.75 inches diameter (6 square inches) for air flow measurement. The upstream side of the sample fixture was connected to a flow meter in line with a source of dry compressed air. The downstream side of the sample fixture was open to the atmosphere.

Testing was accomplished by applying a pressure of 12 mm (0.5 inches) of water to the upstream side of the sample and recording the flow rate of the air passing through the in-line flowmeter (a ball-float rotameter).

Results are reported in terms of Frazier Number which is air flow in cubic meter/min/square meter of sample at 12 mm water pressure or in cubic feet/minute/square foot of sample at 0.5 inches water pressure.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. An article comprising:
    a porous substrate having active particles adhered to the surface of said substrate by a polymer adhesive which comprises (a) strings of polymer, and (b) dispersion primary polymer particles, whereby the active particles are tethered by the adhesive.

2. The article of claim 1, wherein the active particles comprise catalyst particles.

3. The article of claim 1, wherein the active particles comprise reactive particles.

4. The article of claim 1, wherein the active particles comprise particles of more than one material composition.

5. The article of claim 1, wherein the active particles comprise vanadium oxide supported on titanium oxide.

6. The article of claim 1, wherein said polymer adhesive comprises at least one material selected from the group consisting of FEP, PTFE, HMW-PE and HMW-PP, PFA, PVDF, THV and CFE.

7. The article of claim 1, wherein the at least one porous substrate comprises at least one of a woven fabric, a nonwoven fabric, a membrane, an open-celled foam, sintered particulates, a fibrous/particulate network, and combinations thereof.

8. The article of claim 1, wherein said porous substrate comprises multiple porous layers, each layer having the same material composition.

9. The article of claim 1, wherein said porous substrate comprises a first porous layer and at least one second porous layer, said at least one second porous layer having a material composition different from the material composition of the first porous layer.

10. The article of claim 1, wherein said porous substrate comprises multiple porous layers, each layer incorporating active particles of a different material composition.

11. The article of claim 1, further comprising at least one microporous layer.

12. The article of claim 11, wherein the at least one microporous layer is attached to at least a portion of the porous substrate.

13. The article of claim 11, wherein the microporous layer is laminated to the porous substrate.

14. The article of claim 11, wherein the microporous layer is attached to at least a portion of the porous substrate by at least one of welding, sewing, tacking and clamping.

15. The article of claim 11, wherein the microporous layer includes active particles therein.

16. The article of claim 11, wherein said at least one microporous layer comprises expanded PTFE membrane.

17. The article of claim 11, wherein at least one of the at least one microporous layers is on the upstream side of the porous substrate.

18. The article of claim 17, further comprising at least one microporous layer on the downstream side of the porous substrate.

19. The article of claim 11, wherein at least one of the at least one microporous layers is within the porous substrate.

20. The article of claim 11, wherein at least one of the at least one microporous layers is on the downstream side of the porous substrate.

21. The article of claim 11 in the form of a filter bag.

22. The article of claim 11 in the form of a pleated cartridge.

23. The article of claim 11 in the form of a flat filter panel.

* * * * *